US008300043B2

United States Patent
Sundström et al.

(10) Patent No.: US 8,300,043 B2
(45) Date of Patent: Oct. 30, 2012

(54) PROXIMITY ASSISTED 3D RENDERING

(75) Inventors: Henrik Sundström, Södra Sandby (SE); Johan Gulliksson, Bjärred (SE)

(73) Assignee: Sony Ericsson Mobile Communications AG, Lund (SE)

( * ) Notice: Subject to any disclaimer, the term of this patent is extended or adjusted under 35 U.S.C. 154(b) by 1430 days.

(21) Appl. No.: 10/875,347

(22) Filed: Jun. 24, 2004

(65) Prior Publication Data

US 2005/0286125 A1    Dec. 29, 2005

(51) Int. Cl.
*G06T 15/00*    (2011.01)
*G06K 9/36*    (2006.01)

(52) U.S. Cl. ........................................ 345/419; 382/276
(58) Field of Classification Search ........................ None
See application file for complete search history.

(56) References Cited

U.S. PATENT DOCUMENTS

| | | | | |
|---|---|---|---|---|
| 5,608,850 | A * | 3/1997 | Robertson | 345/427 |
| 6,075,557 | A * | 6/2000 | Holliman et al. | 348/51 |
| 6,175,379 | B1 * | 1/2001 | Uomori et al. | 348/47 |
| 6,532,447 | B1 | 3/2003 | Christensson | |
| 6,757,422 | B1 * | 6/2004 | Suzuki et al. | 382/154 |
| 7,146,026 | B2 * | 12/2006 | Russon et al. | 382/117 |
| 2002/0015007 | A1 | 2/2002 | Perlin et al. | |
| 2003/0035001 | A1 * | 2/2003 | Van Geest et al. | 345/753 |
| 2003/0151810 | A1 | 8/2003 | Haisch et al. | |
| 2004/0004616 | A1 * | 1/2004 | Konya et al. | 345/419 |
| 2005/0221791 | A1 | 10/2005 | Angelhag | |

FOREIGN PATENT DOCUMENTS

| | | |
|---|---|---|
| EP | 1 037 167 | 9/2000 |
| EP | 1 098 498 | 5/2001 |
| JP | 10108152 A * | 4/1998 |

OTHER PUBLICATIONS

International Search Report, No. PCT/EP2005/006630, mailed Aug. 18, 2005.

* cited by examiner

*Primary Examiner* — Kee M Tung
*Assistant Examiner* — Haixia Du
(74) *Attorney, Agent, or Firm* — Renner, Otto, Boisselle & Sklar, LLP (57) ABSTRACT

A mobile device for rendering or transforming three-dimensional images is disclosed. The mobile device determines a distance and/or location of a user relative to the device and adjusts the three-dimensional image to provide improved viewing of the three-dimensional image at the sensed distance and/or location.

15 Claims, 5 Drawing Sheets

PROXIMITY ASSISTED 3D RENDERING

BACKGROUND OF THE INVENTION

1. Technical Field

The present invention relates to display screens affording three-dimensional imaging, and more particularly, but not by way of limitation, to three-dimensional imaging for specific applications such as mobile telephone and computer display screens.

2. History of the Related Art

The popularity and worldwide acceptance of computers and hand-held mobile telephones is well recognized. This wide spread use has resulted in the computer and mobile telephone becoming common parts of both modern society and contemporary business. There are many reasons for the success of these technologies, and they include the inherent ease with which a user can communicate and/or access information, as well as popular amenities associated therewith. Inherent in both telephonic communication and the accessing of information is the display screen for both mobile telephones and computers.

Within recent years, both computer screens and mobile telephone hand set display screens have manifested technological innovation and related amenities. Today, both computer and mobile telephone display screens are being manufactured and sold in a variety of sizes and shapes which utilize the most advanced liquid crystal display (LCD) technology to provide enhanced, color, and low power viewing. The "low power" aspect of the display screen is particularly significant in the area of mobile telephones. Demands on the function of modern mobile telephones have required improved efficiency in power consumption and battery life. Likewise, viewing enhanced by certain display technologies have afforded the user of both computer and mobile telephones more clarity and efficiency, which allows improvements in aspects such as three-dimensional display imaging.

Stereoscopic, or three-dimensional, imaging is a technique for creating an illusion of depth in a two-dimensional image. Three-dimensional imaging is gaining acceptance and popularity in various applications such as photography, video, gaming, mobile telephones, and animation.

Three-dimensional imaging is currently rendered by a pair of two-dimensional images. To create a perception of depth, or a three-dimensional image, the left eye of a viewer is provided a different image than that of the right eye. The different images are two perspectives of the same image, with a minor deviation similar to the perspectives that both eyes naturally receive in binocular vision. In the mid-$19^{th}$ century, Charles Wheatstone created the first version of stereoscopy by printing two slightly different images side-by-side. The viewer is required to force his eyes either to cross or diverge so that the two images appear to be three. Then as each eye sees a different image, the effect of depth is achieved in the central image of the three. This technique was later refined to include special cameras for taking simultaneous slightly different pictures and a double lens stereoscope for viewing the special pictures.

To create a stereoscopic movie, two images are projected superimposed onto the same screen through orthogonal polarizing filters. The viewer wears eyeglasses that include a pair of orthogonal polarizing filters. As each filter passes light which is similarly polarized and blocks the orthogonally polarized light, each eye only sees one of the images, and the effect of three-dimensional imaging is created. In a similar endeavor, a three-dimensional image may be created using color filters instead of polarizing filters. An image for one eye of the viewer is created in a first color, such as red, and the image for the other eye is created in a contrasting color, such as blue or green. The viewer then views the image through a pair of eyeglasses with color filters for each eye. The color filter system works well for black and white images, however, the color filters affect the appearance of colors in a colored image.

Current three-dimensional graphics for applications on a screen, such as a mobile telephone or computer laptop, may be rendered by sending a specific set of images to a left eye of the viewer and a different set of images to a right eye of the viewer, thus creating a depth impression. The relative position of the screen and the eye are fixed such that the eye is a predetermined range from the screen (e.g., 30-50 cm) and the eye is leveled at a straight angle from the center of the screen. The sets of images are superimposed on the screen, however, the sets of images show a slightly different perspective of the three-dimensional image. The images for one eye are slightly shifted horizontally from the images for the other eye. When a viewer is not within the predetermined range from the screen, then the three-dimensional image is not viewed properly. For example, the three-dimensional image may be blurred break down into the separate sets of images for the right and left eyes. In addition, three-dimensional images for mobile telephones, laptops, etc. are currently only viewable from a front angle.

BRIEF SUMMARY OF THE INVENTION

The present invention relates to display screens and more particularly, to mobile telephone handsets, and computer display screens and related communication devices utilizing three-dimensional imaging to facilitate enhanced viewing. In one embodiment, the present invention includes a device adapted for displaying a three dimensional image. The device comprises a display surface for displaying the three dimensional image, a sensor for gathering distance data related to at least one of a location and a distance between the device and a user of the device, and an image generator for generating the three dimensional image based on the distance data. The sensor may be a proximity sensor, a camera which creates distance data based on a size of a feature of the user, or systems utilizing other distance detecting technology.

In another embodiment, the above described location or distance data comprises a sensed distance between the user and the device, or a difference between a previous set of distance data and a currently sensed set of distance data. In certain embodiments, the invention is incorporated into at least one of a mobile telephone, a personal digital assistant (PDA), and a laptop computer.

In yet another aspect, one embodiment of the invention includes a method of rendering a three dimensional image. The method comprises the steps of sensing at least one of a location and a distance of a user, creating distance data based on the location and/or distance of the user, and rendering the three dimensional image based on the distance data. The method may further comprise the steps of re-sensing the location and/or distance of the user, determining whether the rendered three dimensional image requires adjusting, adjusting the rendered three dimensional image if it is determined that the rendered three dimensional image requires adjusting, and determining whether an imaging application requiring rendering of the three dimensional image should be ended. If it is determined that the imaging application should not be ended, one embodiment of the invention includes repeating the steps of re-sensing, determining whether the rendered three dimensional image requires adjusting, adjusting, and determining whether an imaging application requiring rendering of the three dimensional image should be ended.

In a further aspect, one embodiment of the invention includes a method of transforming a pre-rendered three dimensional image. The method comprises the steps of receiving the pre-rendered three dimensional image, sensing at least one of a location and a distance of the user, generating distance data based on the sensed location or sensed distance of the user, and transforming the pre-rendered three dimensional image based on the distance data. The above-described method may also include the steps of re-sensing the location or distance of the user, determining whether the transformed pre-rendered three dimensional image requires adjusting, adjusting the transformed pre-rendered three dimensional image if it is determined that the pre-rendered three dimensional image requires adjusting, and determining whether an imaging application requiring transforming of the three dimensional image should be ended. If it is determined that the imaging application should not be ended, one embodiment of the invention includes repeating the steps of re-sensing, determining whether the transformed pre-rendered three dimensional image requires adjusting, adjusting, and determining whether an imaging application requiring transforming of the three dimensional image should be ended.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE INVENTION

In accordance with embodiments of the present invention, a proximity sensor may be utilized to establish the distance of a viewer of the mobile telephone relative to a display screen. A variety of proximity sensors, such as those described in U.S. Pat. No. 6,532,447 and U.S. patent application Ser. No. 10/818,006, both incorporated by reference herein in their entirety, may be utilized to determine distance data. Embodiments of the present invention provide a proximity sensor that may be used to adopt the perspective and shifting of the "left" and "right" image of a three dimensional image. The shifting and/or rendering based on the distance data from the proximity sensor allows the user to experience ideal viewing at any distance. This applies to both real-time rendered three-dimensional images and to pre-rendered images. The former are rendered based on the distance data and the latter are perspective transformed and shifted. Stereoscopic images can also be transformed on-the-fly based on the distance data. The distance data may also be calculated from a camera of the device, if the camera is directed at the viewer (a video telephony enabled mobile phone, for instance). As defined in more detailed below, the present invention contemplates using image analysis wherein the camera itself is used as a proximity sensor by locating a feature of the viewer and utilizing the size and/or spacing thereof to compute distances.

Figure 1A:
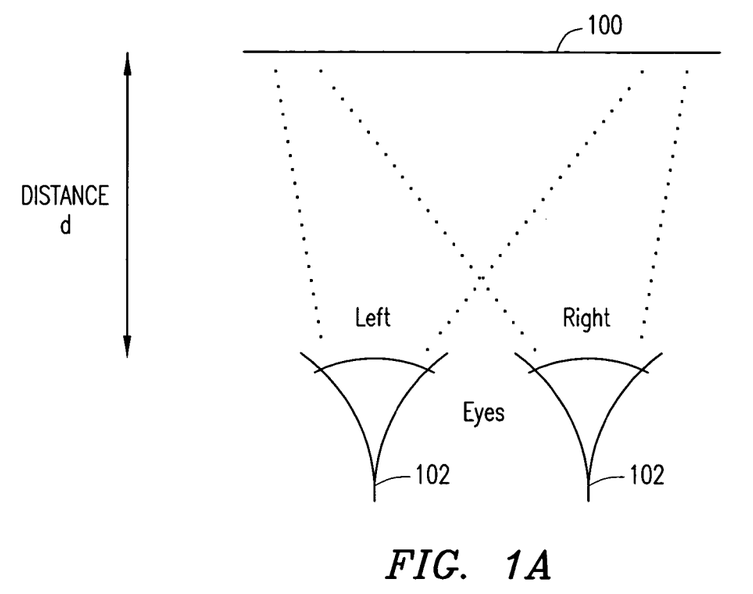
FIGS. 1A-1D is a diagram illustrating three-dimensional imaging shown in a two dimensional medium.
Figure 1B:
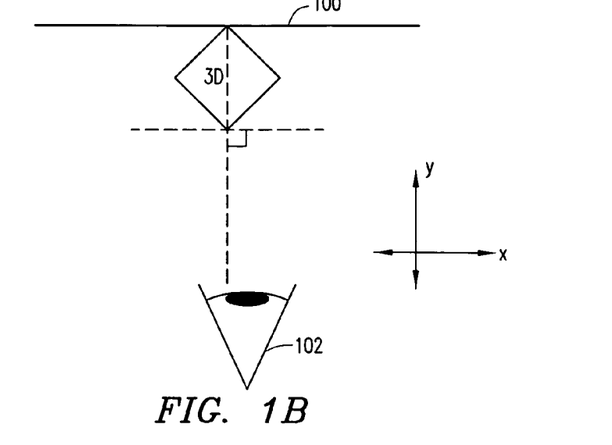
Figure 1C:
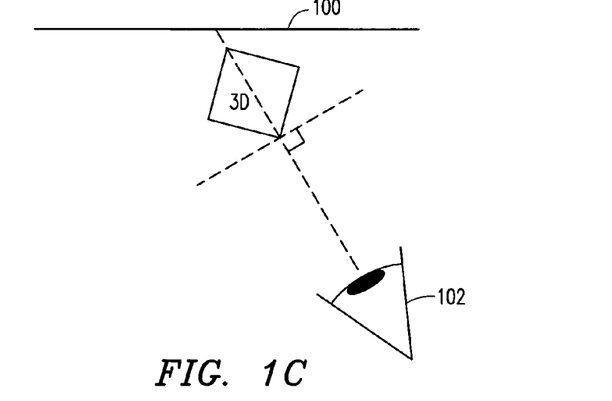

Referring now to FIGS. 1A-1C, three-dimensional imaging on a two-dimensional medium is illustrated. A user may view a front view of a three-dimensional image on a two-dimensional screen 100 at a predetermined distance. For optimal viewing, the eyes 102 of the user should be substantially at the predetermined distance of the screen 100. Typically, the three-dimensional image is created by providing the left eye 102 with an image having a slightly different perspective than the image provided to the right eye 102. When the user is not substantially at the predetermined distance from the screen 100, then the image may be blurry, or break down into the two separate images viewed by each eye 102.

The three-dimensional image is displayed in a front view (e.g., viewed at a perpendicular angle) on the display 100. If the user moves in the x-direction, then the image is re-rendered in a front view at the new user's location, in accordance with FIG. 1C. In accordance with some embodiments of the present invention, three-dimensional images may be rendered to provide a side view of the three-dimensional image to the user.

Figure 1D:
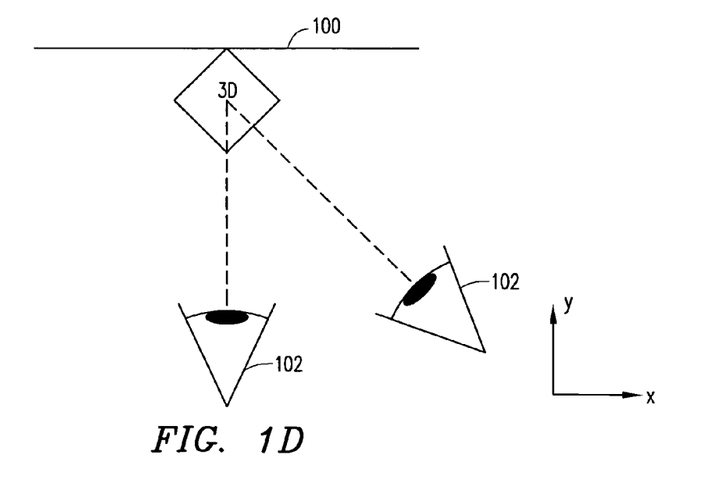

Referring now to FIG. 1D, viewing a side view of a three-dimensional image is illustrated. By rendering different views of the three-dimensional object, a user may be able to see around, above, underneath, etc. the three-dimensional object. The user may move in an x-direction to see the sides of the three-dimensional image or the user may move in the z-direction to see the top or bottom of the three-dimensional image.

Figure 2:
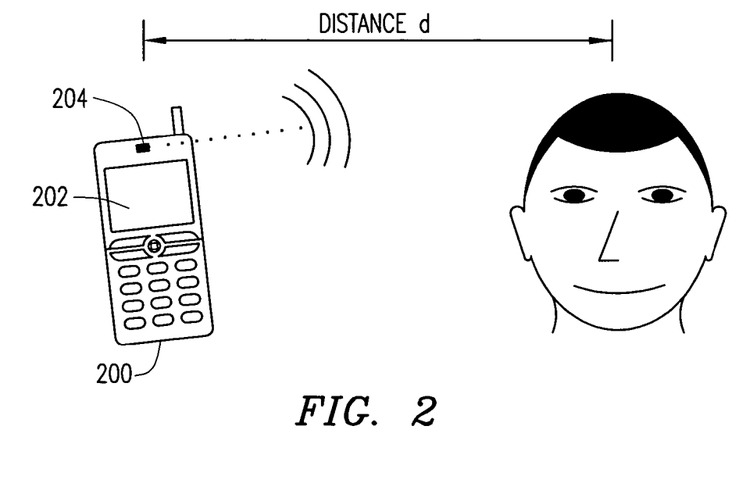
FIG. 2 is a diagram illustrating a mobile telephone according to an embodiment of the present invention.

Referring now to FIG. 2, a mobile telephone incorporating an embodiment of the present invention is illustrated. The mobile telephone 200 includes a display 202 for viewing images and a sensor 204 for determining the location of the user or the distance between the mobile telephone 200 and the user. As noted above, a variety of sensors may be employed to determine the distance or location of an object as described in commonly-assigned U.S. patent application Ser. No. 10/818, 006. For example, a proximity (e.g., a capacitive, inductive, temperature, IR, etc.) sensor may be utilized to determine the distance from the sensor 202 to a user. Based on data received from the sensor 204, the display 202 may show a three-dimensional image rendered specifically for the distance sensed by the sensor 204. In addition, the display may show a three-dimensional image rendered with a front view, side view, etc. based on data received from the sensor 204.

Figure 3:
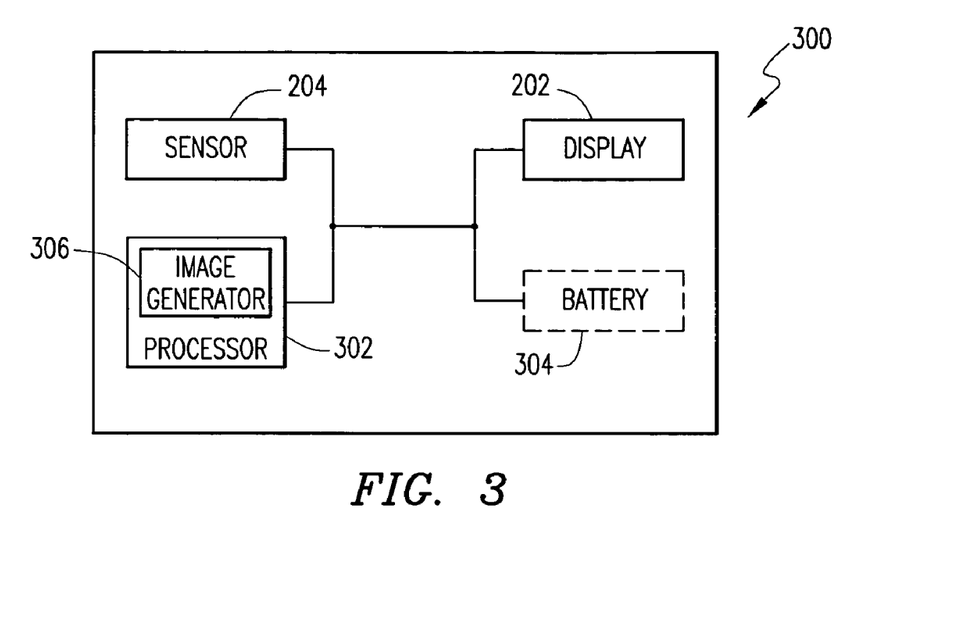
FIG. 3 is a block diagram of a mobile telephone incorporating an embodiment of the present invention.

Referring now to FIG. 3, a mobile device 300, such as a mobile telephone, PDA, laptop, etc., in accordance with an embodiment of the present invention is illustrated. The device 300 includes a sensor 204 for sensing the location or distance of the user and a display 202 for displaying an image. The device also includes a processor 302 for controlling the device 300 and an image generator 306 for generating the three-dimensional images. The image generator 306 may be co-located within the processor 302 or separate from the processor 302 in various embodiments. The device may optionally include a battery 304 for providing power to the device 300.

The processor 302 or image generator 306 receives location or distance data from the sensor 204 and determines a location or distance between the device 300 and a user. Location data as defined herein relates to any type of data utilized to determine a location of the user in two or three-dimensions. Distance data as defined herein relates to any type of data utilized to determine a distance between the device 200 and the user. For example, distance data may be the actual distance (e.g., in centimeters, inches, etc.) from the device 200 to the user. Alternatively, as shown below with reference to FIG. 4, the distance data may relate to a particular parameter that is then looked-up in a data table accessed by the processor 302 or image generator 306. For example, the distance data may relate to a size of a feature of the user's face or a distance between various features of the user's face (e.g., distance between pupils of the user's eyes). The location or distance data relating to features of the user may be calculated by using a camera as described below. Relative sizes of features and distances may be cross-referenced in the data table so that when the processor 302 receives a feature size, the distance may be determined by retrieving the distance associated with the feature size in the data table.

When rendering three-dimensional images in real-time, the location or distance data is utilized to render the three-dimensional image on the display 202. The three-dimensional image is rendered for the specific location or distance sensed by the sensor 204. When the device 300 is utilized to present pre-rendered three-dimensional images, the perspective images are transformed and shifted to improve the image quality at the sensed distance. Stereoscopic images may also be rendered on-the-fly based on the distance data transmitted from the sensor 204.

More specifically, three-dimensional images shown on the display 202 are made up of two constituent parts, namely a right image and a left image. The right image is viewed by the right eye and the left image is viewed by the left eye. When rendering the images in three-dimensional imaging, in accordance with the present invention, the left and right images are adapted to the location or sensed distance by shifting the left and right images to achieve an improved user experience at the sensed distance. For example, the sensor 204 may sense a distance d between the user and the device 300. The right and left images are then rendered or transformed and shifted to provide a three-dimensional image to be viewed at distance d. The user may then move the device 300 closer to the user's face, during which the sensor 204 determines that the distance between the device 300 and the user is d−4 centimeters (cm). The right and left images may then be re-rendered or re-transformed and shifted to provide a three-dimensional image to be viewed at distance d−4 cm. Regardless of how far each user holds a device 300 from himself, the three-dimensional image may be adjusted to provide an optimal viewing experience.

Figure 4:
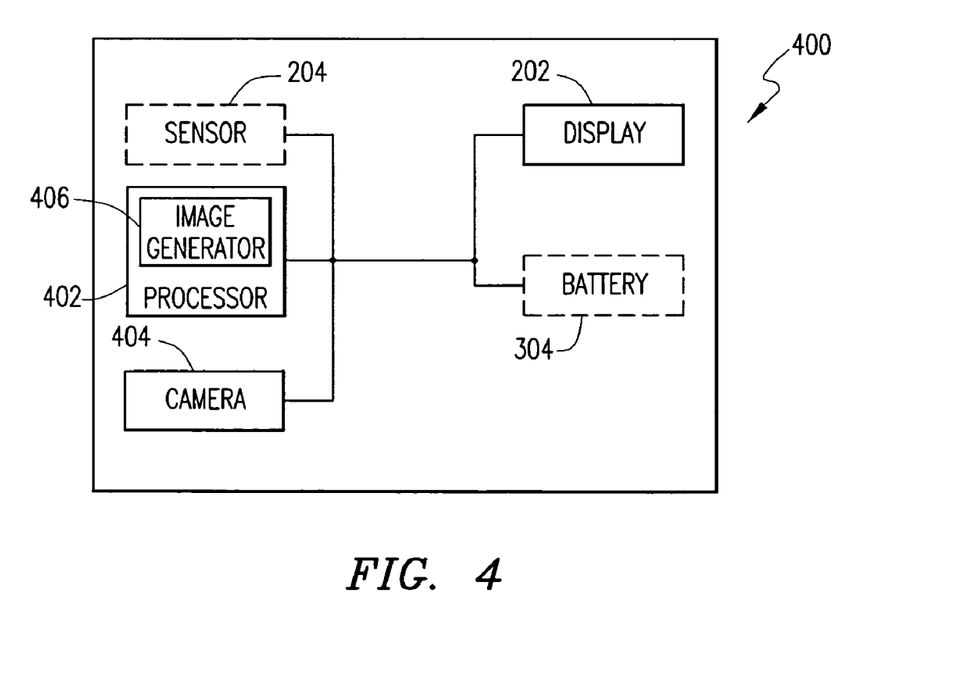
FIG. 4 is a block diagram of a mobile telephone incorporating an alternative embodiment of the present invention.

Referring now to FIG. 4, a mobile device 400 in accordance with an alternate embodiment of the present invention is illustrated. The mobile device 400 includes a processor 402, image generator 406, display 202, and optional battery 304 in a manner similar to that shown in FIG. 3. However, a camera 404 may be used in place of, or in conjunction with, an optional sensor 204 for determining the distance between the user and the device 400. In one embodiment, the sensor 204 and the camera 404 may be utilized together to determine a location or an accurate distance d. In an alternate embodiment, the camera 404 may replace the sensor 204 in determining the location or distance d. In the alternate embodiment, the camera 404 is solely responsible for providing location or distance data to the processor 402 and the sensor 204 may not be present in the device 400.

As the sensor 204 may sense the location or distance from the device 400 to a particular feature of the user (e.g., nose, eyes, face, ear, etc.), the camera 404 may determine the location or distance from the device 400 to the user based on a number of techniques. For example, the camera 404 may capture an image of the user and determine the location or distance based on the size of a particular feature (e.g., eyes, nose, face, mouth, etc.). As a user moves to either side of the device 400 or closer to or farther from the device 400, the image captured by the camera 404 may be analyzed to determine the size or location of the particular feature. As a user moves, the processor 402 may receive one or more images from the camera 404 and compare the relative size of a particular feature from two or more images to determine a location or change in distance. Alternatively, the processor 402 may receive one or more images and calculate a location or distance independent of any other received images from the camera 404.

For example, the camera 404 may capture an image and the processor 402 then determines a location or distance d based on that image. The camera 404 may then capture an additional image at a later point in time and the processor compares the later image to the previous image to determine a difference in location or distance, such as +2 cm, between the captured images. The right and left images for presentation on the display 202 may then be adjusted for a viewing distance of d+2 cm. Alternatively, the images may be adjusted for viewing a side, top, bottom, etc. view of the image. As noted above, the camera 404 may capture an image and the processor 402 calculates the distance between the user and the device 400 based on the captured image without a comparison to any other previous or later captured images. Furthermore, the camera 404 may be used in conjunction with, or in place of, the sensor 204 to sense the location or distance between the user and the device 400. The camera 404 may be utilized to determine the initial location or distance and the sensor 204 may sense the location or distance at predetermined intervals. Alternatively, the sensor 204 may sense the initial location or distance and the camera 404 may be utilized to update the sensed location or distance at predetermined intervals. It will be understood by one skilled in the art that various other combinations between the camera 404 and the sensor 204 may be utilized to determine the location or distance between the device 400 and the user.

In addition, a range may be created around the sensed location or distance to prevent the image from being adjusted based on minor changes in the sensed location or distance. For example, if the user is currently viewing a three-dimensional image at distance d, then the image may not be adjusted if the user remains in an acceptable range of, for example, d±5 cm. When the sensor 204 or camera 404 determines that the user has gone outside of the acceptable range, then the image is adjusted for the user's new viewing distance. It will be understood by one skilled in the art that the range of d±5 cm is merely exemplary in nature and other ranges may be utilized without departing from aspects of the present invention.

Figure 5:
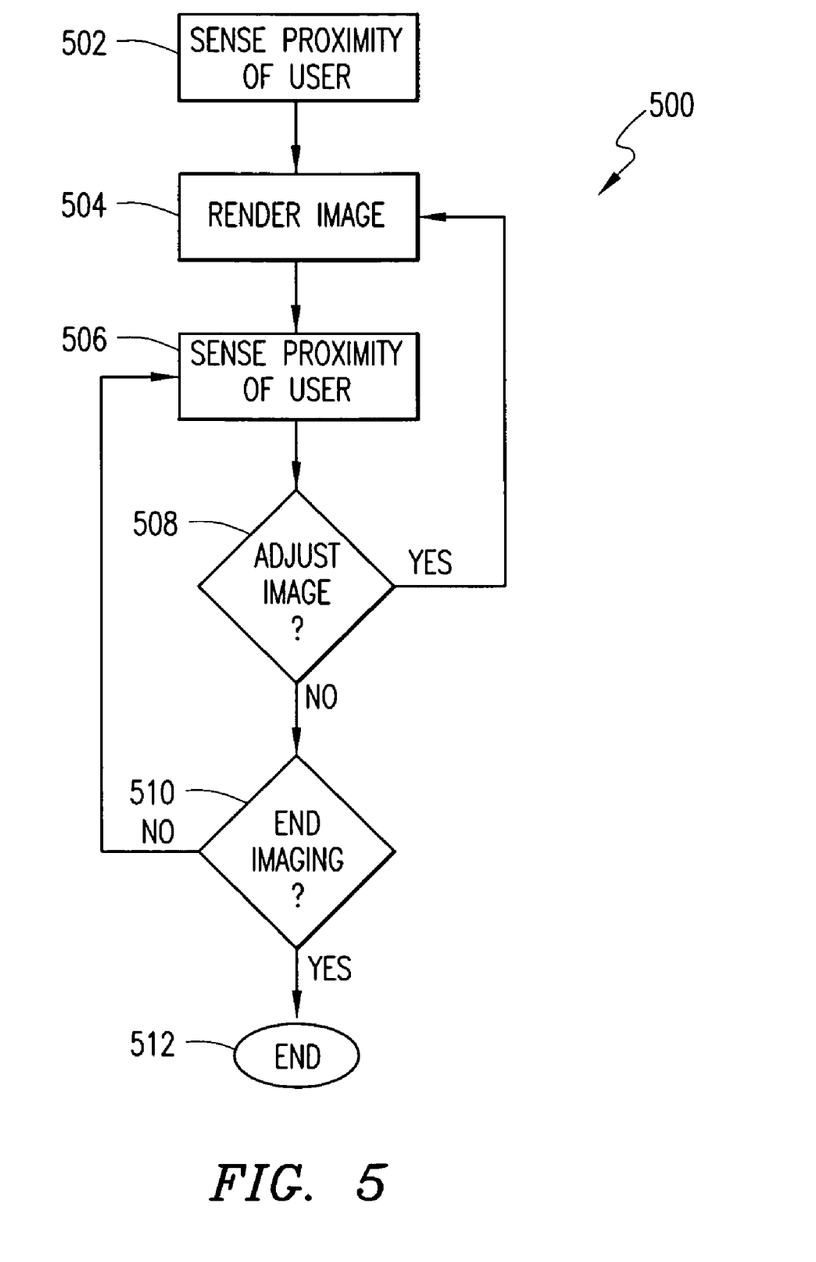
FIG. 5 is a flow diagram illustrating a method of rendering three-dimensional images in accordance with an embodiment of the present invention.

Referring now to FIG. 5, a flow diagram illustrating a method 500 for rendering three-dimensional images is illustrated. At step 502, the location or distance between the device and the user is sensed via a sensor 204, camera 404, or both. The image is rendered for viewing at the sensed location or distance at step 504. At step 506, the location or distance of the user is sensed at a predetermined time interval from the sensing of step 502. Alternatively, step 506 may be initiated in response to an action, such as a sensed movement of the user or the device 400. At step 508, the image generator 306, 406 determines whether the image should be adjusted. As previously mentioned, the image may be adjusted at each change in the sensed location/distance or when the sensed location/distance falls outside of an acceptable range.

If it is determined at step 508 that the image should be adjusted, then the method loops back to step 504. If it is determined that the image should not be adjusted, then, at step 510, it is determined whether imaging should be terminated. If the imaging should be terminated, then at step 512, the imaging application is ended. If at step 510 it is determined that imaging should not be terminated, then the method loops back to step 506. Step 510 may loop back to step 506 at predetermined intervals or in response to an action, such as a user initiated action (e.g., activation of a button or key), sensed movement of the user, or sensed movement of the device 400.

Figure 6:
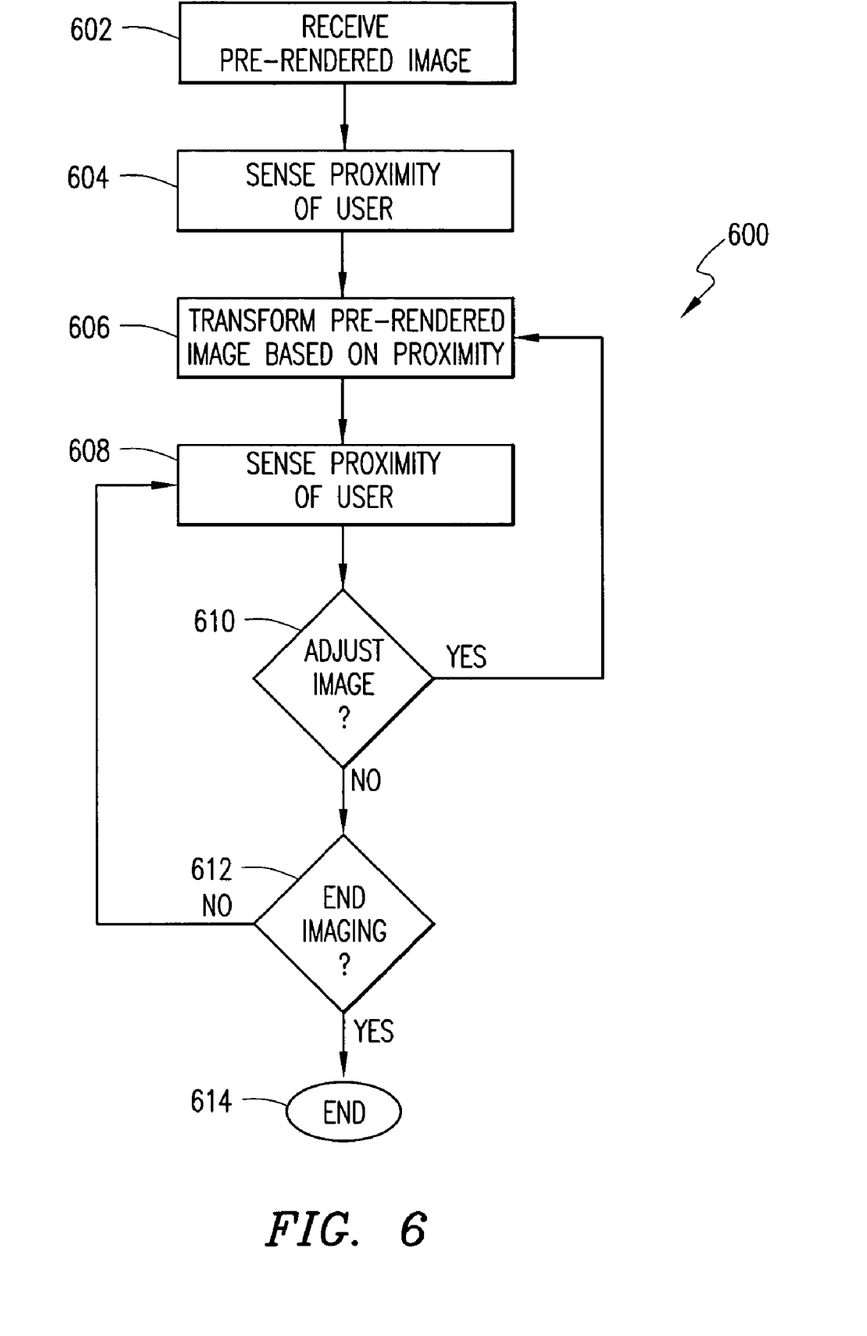
FIG. 6 is a flow diagram illustrating a method of rendering three-dimensional images in accordance with an alternate embodiment of the present invention.

Referring now to FIG. 6, a flow diagram illustrating a method 600 for adjusting pre-rendered three-dimensional images is illustrated. At step 602, the pre-rendered image is received or initiated at the device 300, 400. At step 604, the location or distance between the device 300, 400 and the user is sensed via a sensor 204, camera 404, or both. The image is adjusted for viewing at the sensed location or distance at step 606. At step 608, the location or distance between the user and the device 300, 400 is sensed. Step 608 may be initiated at predetermined time intervals or in response to an action, such as a sensed movement of the user or the device 300, 400. At step 610, the image generator 306, 406 determines whether the image should be adjusted based on the location or distance data. As previously mentioned, the image may be adjusted at each change in the sensed location/distance or when the sensed location/distance falls outside of an acceptable range.

If it is determined at step 610 that the image should be adjusted, then the method loops back to step 606. If it is determined that the image should not be adjusted, then, at step 612, it is determined whether imaging should be terminated. If the imaging should be terminated, then at step 614, the imaging application is ended. If at step 612 it is determined that imaging should not be terminated, then the method loops back to step 608. Step 612 may loop back to step 608 at predetermined intervals or in response to an action, such as a user initiated action, sensed movement of the user, or sensed movement of the device 300, 400 as noted above.

It is thus believed that the operation and construction of various embodiments of the present invention will be apparent from the foregoing Detailed Description. While various devices have been described, it will be obvious to a person of ordinary skill in the art that various changes and modifications may be made therein without departing from the spirit and scope of the invention, as defined in the following claims. Therefore, the spirit and the scope of the appended claims should not be limited to the description of the embodiments contained herein.

What is claimed is:

1. A mobile telephone adapted for displaying a three-dimensional image, the mobile telephone comprising:
   a display surface displaying the three dimensional image;
   a camera disposed on the mobile telephone and configured to capture at least one image of the user, the captured image comprising at least one feature of the user;
   a processor configured to analyze, independent of user input, the captured image and determine a size of a feature as it appears in the captured image, and to create distance data based on the determined size of the feature, the distance data being indicative of a distance between the user and the mobile telephone; and
   an image generator configured to generate a three-dimensional image based on the distance data.

2. The device of claim 1, further comprising a proximity sensor.

3. The device of claim 1, wherein the feature is at least one of an eye, a nose, a face, and a mouth of the user.

4. The device of claim 1, wherein the distance data comprises a difference between a previous set of location data or distance data and a currently sensed set of location data or distance data.

5. The device of claim 1, further comprising a rechargeable battery.

6. A mobile telephone adapted for displaying a three dimensional image, the mobile telephone comprising:
   a display surface displaying the three dimensional image;
   a sensor that real-time senses a location and/or a distance of a user relative to the mobile telephone;
   a processor that determines distance data based on the real-time sensed location and/or distance of the user relative to the mobile telephone; and
   an image generator that generates a three dimensional image based on the distance data; and
   wherein the processor determines independent of user input a distance between two features of the user and distance data based on the distance between two features of the user real-time sensed by the sensor.

7. The device of claim 6, wherein the two features are a left eye and a right eye.

8. The device of claim 6, wherein the two features are an eye and a nose.

9. The device of claim 6, wherein the sensor is a proximity sensor.

10. The device of claim 6, wherein the sensor is a camera.

11. The device of claim 6, wherein the distance data comprises a difference between a previous set of location data or distance data and a currently sensed set of location data or distance data.

12. A method of rendering a three dimensional image on a mobile telephone, the method comprising the steps of:
   real-time sensing a location and/or a distance of a user relative to the mobile telephone;
   creating distance data based on the sensed location and/or the distance of the user relative to the mobile telephone; and
   rendering the three dimensional image based on the distance data; and
   wherein the distance data is created by capturing at least one image of the user, the image including at least one feature of the user, and analyzing, independent of user input, the captured image to determine a size of the feature as it appears in the captured image, and creating distance data based on the determined size of the feature.

13. The method of claim 12, further comprising the steps of:
   re-sensing the location and/or the distance of the user relative to the mobile telephone;
   determining whether the rendered three-dimensional image requires adjusting;
   adjusting the rendered three-dimensional image if it is determined that the rendered three dimensional image requires adjusting; and
   determining whether an imaging application requiring rendering of the three dimensional image should be ended.

14. The method of claim 13, further comprising, if it is determined that the imaging application should not be ended, repeating the steps of re-sensing, determining whether the rendered three dimensional image requires adjusting, adjusting, and determining whether an imaging application requiring rendering of the three dimensional image should be ended.

15. The method of claim 13, wherein the step of determining whether an imaging application should be ended comprises the step of receiving an input from the user to end the imaging application.

* * * * *